United States Patent [19]

Rendina et al.

[11] Patent Number: 5,185,401
[45] Date of Patent: Feb. 9, 1993

[54] MONOFUNCTIONAL POLYMERS OF OLEFINS AND BLOCK COPOLYMERS OBTAINED THEREFROM

[75] Inventors: Gabriele Rendina, Torino; Enrico Albizzati, Arona, both of Italy

[73] Assignees: Ausimont S.R.L., Milan, Italy; Himint Incorporated, Wilmington, Del.; Montedison S.P.A., Milan, Italy

[21] Appl. No.: 863,489

[22] Filed: Apr. 2, 1992

Related U.S. Application Data

[63] Continuation of Ser. No. 375,947, Jul. 6, 1989, abandoned.

[30] Foreign Application Priority Data

Jul. 7, 1988 [IT] Italy ................. 21265 A/88

[51] Int. Cl.$^5$ .................................... C08F 8/30
[52] U.S. Cl. .................... 525/130; 525/333.7; 525/333.9; 525/343; 525/351; 525/354; 525/378; 525/379
[58] Field of Search ............................ 525/130

[56] References Cited

U.S. PATENT DOCUMENTS 4,276,394  6/1981  Kennedy et al.
4,888,389  12/1989  Kennedy et al. ............. 525/130

OTHER PUBLICATIONS

Polymer Bulletin, vol. 8, p. 563 (1982), Kennedy et al. "New Telechelic Polymers and Sequential Copolymers by Poly . . . ".

*Primary Examiner*—Bernard Lipman
*Attorney, Agent, or Firm*—Stevens, Davis, Miller & Mosher

[57] ABSTRACT

Functional polyolefins containing a terminal functional group; the block copolymers that can be obtained from such polyolefins by reaction with polymers reactive with the functional groups and the precursors used for the preparation of the functionalized polyolefins, which are made of olefin polymers terminated at one end with ZnR groups where R is an alkyl or aryl radical with 1-10 carbon atoms.

5 Claims, No Drawings

MONOFUNCTIONAL POLYMERS OF OLEFINS AND BLOCK COPOLYMERS OBTAINED THEREFROM

This application is a continuation of application Ser. No. 07/375,947, filed Jul. 6, 1989 now abandoned.

DESCRIPTION OF THE INVENTION

The present invention relates to monofunctional olefinic polymers, block copolymers obtained from them, and polymeric precursors used for the preparation of the monofunctional polymers.

In the technical field there is a need for olefinic polymers which will enable one to resolve in a satisfactory manner the problem of lack of chemical functionality typical of polyolefins. Of particular interest is the ability to have at one's disposal polyolefins with good metal adhesion properties, or that can be used as compatibilizing agents for polyolefins with noncompatible polymers.

From the technical literature there are well known copolymers of olefins formed by blocks of olefins which differ from one another, or by blocks which derive from the same olefin but have different steric configurations. These copolymers, however, found no industrial application basically because of the complex preparation methods. In fact, they are obtained with sequential polymerization processes of olefins using Ziegler-Natta catalysts, where the mild polymerization conditions, combined with the use of catalysts of low activity, are such as to render the processes unattractive from a practical point of view.

Also known are ethylene polymers containing blocks of polar monomers such as acrylic esters, which can be obtained either through high pressure radical polymerization of the ethylene, or through polymerization processes with Ziegler-Natta catalysts using suitable catalyst systems. The preparation processes of these copolymers found no practical application either.

Finally, there are known copolymers with an SB or SBS structure where S is a polystryene block and B a polybutadiene block, and the derivatives of such copolymers obtained by hydrogenation of the polybutadiene block, which have SEB and SEBS structures, where EB indicates a block of ethylene and butylene units.

From the hydrogenated copolymers are obtained, by grafting with polar monomers, polymers with combined properties of chemical inertia derived from the polyolefinic chain, and adhesion to metal characteristics which are typical of the polar groups introduced into the chain. The preparation of these functionalized polymers is, however, very complex and burdensome.

Now there are monofunctional olefin polymers from which one can obtain bi- or multiblock copolymers containing one or more polar monomer blocks, which offer a relatively simple solution to the problem of the lack of chemical functionality of polyolefins.

The monofunctional polyolefins of the present invention are characterized by the fact that they terminate at one end with chemically functicnal groups, or structures containing chemically functional groups.

They are represented by the formula:

P—X where P is a chain of homo- or copolymers of olefins $CH_2=CHR$ where R is a hydrogen or an alkyl or aryl radical with 1-8 C, and X is a functional group or structure containing functional groups.

P, for example, may be polyethylene, polypropylene, ethylene-propylene copolymers, polybutene, isotactic or syndiotactic polystyrene.

Preferably P is isotactic polypropylene, ethylene-propylene rubber copolymers optionally containing smaller proportions of diene selected from butadiene, hexadiene, and 1,4 ethylidene norbornene.

The functional groups include polar groups as well as polymerizable groups or halogen atoms. Examples of functional groups are —COOR, —CO, —NH$_2$, —SCN, —CN, —OH$_2$ and isocyanic groups.

The monofunctional polyolefins are obtained from polyolefins ended with —ZnR groups, where R is an alkyl or aryl radical with 1-10 C, by reaction with substances which give substitution reactions with R'ZnR'' type compounds, where R' and R'', equal or different from each other, have the same meaning as the above mentioned R, or one of the two is a halogen atom or an —OR group.

The polyolefins terminating with —ZnR groups are obtained by polymerization of the corresponding olefins or mixtures of olefins with Ziegler-Natta catalysts operating in the presence of chain terminators of formula —ZnR'R'', where R' and R'', equal or different from each other, are alkyl or aryl radicals containing 1-10 C.

The polymerization is carried out in the absence of hydrogen (in order not to have chain terminations different from those obtained with the Zn-alkyl compounds), operating at relatively low temperatures (room temperature or lower: this is to limit the breaking of the C—Zn bond) and at atmospheric pressure or lower (in order not to obtain molecular weights too high).

Polymerizations carried out under the above-mentioned conditions using Zn-alkyl or -aryl compounds as chain terminators are not known so far. The polymers obtained are formed mainly by polymeric chains terminated at one end with the —ZnR group.

The polymers obtained in this way are reacted with compounds which react with the —ZnR group while operating under conditions wherein at least one of the reactants is dissolved in an inert hydrocarbon solvent or is in the molten state.

Examples of reactive compounds are the di- and polyisocyanates, the chloroesters such as chloroformate, epichlorohydrin chloroamine, ketenes, ketones, aldehydes, chloroethers, and oxygen.

From monofunctional polymers, bi- or multiblock copolymers may be obtained through reaction with polymers containing reactive groups.

Examples of reactive polymers that may be used are polyalkylene glycols, polyesters, polyamides, polyacrylates, polycarbonates, styrene copolymers with maleic anhydride, polyphenyleneoxides, and starch.

Examples of the derived block copolymers have the following structure:

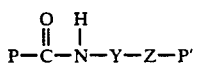

where P is a polyolefin chain;

Y is an arylene or arylalkylene radical containing from 6 to 14

C atoms or an alkylene radical with 1-20 C;
Z is a group of the formula:

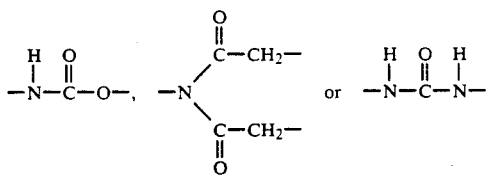

P' is a macromolecule of a polymer selected from polycaprolactam, polyester, polyalkyleneglycol, polyvinylacetate, polyphenylene ether, and starch.

The block copolymers are obtained by reacting PX-polymers where X is a radical

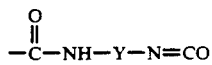

where Y is as indicated above, with polymers having groups which react with such a radical.

The polymers containing isocyanic groups are obtained by reacting polyolefins terminated with the —ZnR group with compounds containing at least two isocyanic groups of the formula Y—(NCO)n where Y has the meaning already indicated and n is a number from 2 to 10.

The operation is done under conditions wherein at least one of the two reagents is in a hydrocarbon solution, or in the molten state.

The reaction may be carried out at a temperature usually between 20° and 150° C.

The preferred compounds containing isocyanic groups are: toluene-diisocyanate, diphenylmethane-diisocyanate, benzene-1,2,4-triisocyanate, and naphtalene-1,2,5,7-tetraisocyanate.

The block copolymers of this invention are represented by the formula PQP' or PQP'QP. Moreover, they may contain P multiblocks in their chain. In these formulas, P has the meaning already indicated, Q is a bivalent radical; and P' is a polymer chain containing polar groups. P' is particular is a chain of a polymer selected from polyesters, polyamides, polyalkylene glycols, polyacrylates, and polymethacrylates, polyvinylacetate, and styrene copolymers with maleic anhydride. Q is a bivalent radical which may have the following structure:

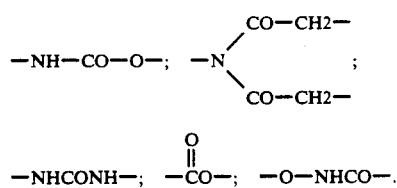

The preparation of the block copolymers is carried out by reacting the reagents in an inert hydrocarbon solvent at a temperature at which dissolution of the polyolefin prepolymer, or by operating with one or both polymers in the molten state.

The block copolymers of this invention may be used in applications where there is a need for chemical inertia of the polyolefins combined with chemical functionality typical of the polar groups present in such copolymers. They are particularly useful as polymers, compatibilizers of polymers in adhesive films, for coating metals also mixed with other polymers.

The following examples are given still better to illustrate the invention.

EXAMPLE 1

In a cylindrical reactor of about 1500 cc there are charged, in a nitrogen atmosphere, in the order listed:
800 cc of anhydrous heptane,
10 mM of $Zn(C_2H_5)_2$,
660 mg of a catalyst prepared according to the methodology described in Example 1 of the Italian patent application No. 26908A/87;
5 mM of $Al(C_2H_5)_3$, and
0.25 mM of phenyl-triethoxysilane.

The thermostat of the reactor was set at 15° C. and a propylene current was bubbled for a period of 5 hrs.

The solvent was then removed and the polymer washed with 500 cc of heptane.

To the polymer were then added 700 cc of heptane and 10 g of diphenylmethane-diisocyanate.

The solvent was brought to the boiling temperature and then refluxed for 8 hrs.

Finally the solvent was removed, the polymer washed three times with heptane, and then vacuum dried. 120 g of polymer were isolated in this way.

GPC analysis (in o-dichlorobenzene at 135° C.) gave the following results:
$\overline{Mn} = 44,600$
$\overline{Mw} = 341,000$
$\overline{Mz} = 767,600$
$\overline{Mvis} = 287,100$
$\overline{Mw}/\overline{Mn} = 7.64$ A nitrogen content equal to 0.086% was found on the polymer as such. After dissolution in xylene and precipitation in methanol this value fell to 0.059%; after an additional dissolution and precipitation it was recorded as 0.058%. These data indicate that the nitrogen was chemically bound to the polymer in an average of 1.8 atoms per polymeric chain.

EXAMPLE 2

In a 1.5 liter autoclave with an agitator and the thermostat set at 25° C. there are introduced, after drying and scavenging, in the order as listed:
100 cc of propylene,
5 mM of $Al(C_2H_5)_2Cl$,
10 mM of $Zn(C_2H_5)_2$,
and ethylene up to a total pressure of 12.2 atm.

Under argon pressure there was then injected a solution of 0.05 mM of triacetylacetone vanadium ($VAcac_3$) and 1 mM of ethyltrichloroacetate in 25 cc. of anhydrous and de-areated toluene.

The polymerization was done at 25° C. for 1 hr, while continuing to add ethylene to maintain a constant pressure of 12.2 atm.

The unreacted monomers were then removed by degassing the reactor. 1000 cc. of anhydrous acetone were then introduced and the autoclave was agitated for 30 minutes.

The acetone was then removed and 600 cc of anhydrous toluene containing 30 mM of diphenylmethane-diisocyanate were introduced.

The polymeric solution was left to react for 1 hr at 25° C., and then transferred, under nitrogen atmosphere, to a flask containing 5 lt of anhydrous acetone. 62 g of polymers were thus obtained with the following results:

Intrinsic viscosity 1.80 dl/g
$\overline{Mn} = 59,000$
$\overline{Mw} = 280,000$
$\overline{Mw}/\overline{Mn} = 4.75$
Ethylene content: 56%
Nitrogen content (after 2 consecutive dissolutions and precipitations) = 0.040%.

EXAMPLE 3

Example 1 was duplicated using 50 mg of catalyst obtained by grinding in a steel mill anhydrous $MgCl_2$ and $TiCl_4$ in such quantity as to have a titanium content of 2% by wt, 4 mM of $Al(C_2H_5)_3$, and 10 mM of $Zn(C_2H_5)_2$, and bubbling in an ethylene current at room temperature.

The same methodology of Example 1 was followed, thereby isolating, after a reaction with diphenylmethanediisocyanate, 150 g of polymer with the following characteristics:

$\overline{Mn} = 86,000$
$\overline{Mw} = 440,000$
Nitrogen content: 0.079
Nitrogen content after dissolution is xylene and precipitation in methanol, 0.072.

EXAMPLE 4

In a 100 cc flask were introduced 96 mM of $TiCl_3$ ARA, in a suspension of toluene.

During a period of 10 minutes there was added, while agitating and cooling the flask, a mixture of $Al(C_2H_5)_3$ (154 mM) and $Zn(C_2H_5)_2$ (307 mM) dissolved in 500 cc. of anhydrous toluene.

Subsequently, there were added 150 g of anhydrous styrene, and after polymerization (3 hrs at 20° C.), the polymer was precipitated and washed repeatedly with anhydrous heptane in an inert atmosphere, after which it was re-swollen with 500 cc. of toluene and reacted with 7 g of diphenylmethane-diisocyanate for 6 hrs at 120° C.

The product thus obtained was precipitated in heptane in an inert atmosphere and vacuum-dried.

100 g of polymer was obtained with the following characteristics:

Intrinsic viscosity (tetrahydronaphthalene, 100° C.) = 1.1 dl/g
Nitrogen content after dissolution in xylene and precipitation in methanol = 0.07%.

EXAMPLE 5

In a 1 liter flask were introduced, in a nitrogen atmosphere, 600 cc of anhydrous xylene and 45 g of functionalized polypropylene prepared as in Example 1.

The temperature was brought to 135° C.

After dissolution of the polypropylene, 15 g of polyethylene glycol of Mn = 4000 (dehydrated for 8 hours in a vacuum at 120° C.) were added.

The polymer solution was stirred for 10 minutes, then the polymer was precipitated in methanol.

52.4 g of the product were thus obtained.

To make sure that the polyethylene glycol has effectively reacted with the polypropylene three different extractions were made on the product with boiling methanol, toluene at room temperature, and boiling toluene, respectively.

In all three cases, in the insoluble fraction through IR spectroscopy the presence of polyethylene glycol was noticed recognizable by the stretching band of the C=O at 1110 cm$^{-1}$) which confirmed that it was chemically bound to the polypropylene.

EXAMPLE 6

In a 1.5 liter flask were introduced, in a nitrogen atmosphere, 700 cc of xylene and 30 g of functionalized polypropylene prepared as in Example 1.

The temperature was brought to 135° C. and after the dissolution of the polymer, 130 g of polyethylene glycol of Mn = 35000 (dehydrated in vacuum for 8 hrs at 120° C.) were introduced.

The mixture was stirred for 20 minutes and then precipitated in methanol. 47 g of polymer were thus obtained.

The presence of chemically-bound polyethylene glycol in the final product was confirmed, as in Example 2, through extractions with methanol and toluene, and consequent IR spectroscopy.

EXAMPLE 7

4 g of polybutylene terephthalate (PBT) (Mw = 50000, Mn-20000) were dissolved in 70 cc of sym-tetrachloroethane, bringing it to the boiling temperature in a 200 cc. flask.

After dissolution, 2.1 g of functionalized polypropylene prepared as in Example 1 were added.

The mixture was stirred for 7 hrs with continuous heating, and then precipitated in methanol.

6 g of product were thus obtained. This was subjected to extraction with boiling xylene to eliminate the polypropylene which did not react.

The residue of the extraction (67% by wt) showed the stretching bands C—H at 2840 and 2920 cm$^{-1}$, which indicate the presence of polypropylene bound to PBT.

EXAMPLE 8

In a glass reactor equipped with an anchor agitator were charged:

7.5 g of styrene-maleic anhydride (containing 24% by wt of maleic anhydride);
15.2 g of functionalized polypropylene with isocyanic groups prepared according to Example 1; and
20 cc of xylene.

The mixture was heated at 160° C. under agitation thus obtaining a solution; after 15 minutes an increase in viscosity was noticed.

The xylene was then left to evaporate and the temperature was brought to 180° C. for 3 hrs thereby obtaining a solid.

At the end of the reaction, the solid obtained was dissolved in boiling xylene and then precipitated in ethanol.

22.5 gr of polymer were obtained, which was subjected to extraction with boiling tetrahydrofuran for 8 hrs to eliminate the styrene-maleic anhydride copolymer which had not reacted.

The presence of styrene-maleic anhydride copolymer chemically bound to the polypropylene was verified in the insoluble fraction through IR spectroscopy (stretching bands of C=O at 1780 and 1850 cm$^{-1}$).

EXAMPLE 9

120 g of polypropylene terminated with —ZnR were prepared according to the methods describe in Example 1.

The solvent was removed and 500 cc of anhydrous cyclohexane were added together with methyl chloroformate ClCOOOCH₃.

The solvent was heated to boiling for 8 hrs.

The polymer was isolated and dried; the presence of —COOCH₃ terminal groups was confirmed through IR spectroscopy.

EXAMPLE 10

120 g of polypropylene terminated with —ZnR were prepared according to the methods described in Example 1.

The solvent was then heated to the boiling temperature and refluxed for 8 hrs in the presence of a dry air current.

Subsequently, 2 cc of concentrated HCl were added and the solvent heated to boiling for 2 additional hours.

The polymer was isolated, dried, and the presence of —OH terminal groups was confirmed through spectroscopy.

What is claimed is:

1. A functional polymer of the formula:

PX wherein P is a polymeric chain selected from the group consisting of chains of polypropylene or of polyethylene or of a copolymer of propylene wherein the polypropylene sequences have an isotactic structure; X is a group of the formula

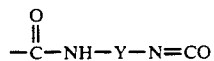

wherein Y is an arylene or aralkylene radical containing from 6 to 14 C or an alkylene radical.

2. Polymers according to claim 1 wherein X is a

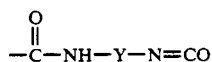

group, wherein Y is an arylene radical containing from 6 to 14 C or an alkylene radical with 1-20 C.

3. Polymers according to claim 1 where P is isotactic polypropylene.

4. A polymer according to claim 1, wherein Y in the group of the formula

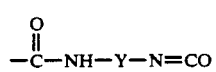

is a phenylene substituted with isocyanate groups and/or with alkyl groups containing from 1 to 6 C.

5. A functional polymer of the formula

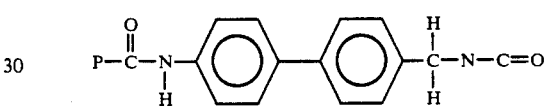

wherein P is a polymeric chain of a homopolymer of propylene.

* * * * *